Figure 1:
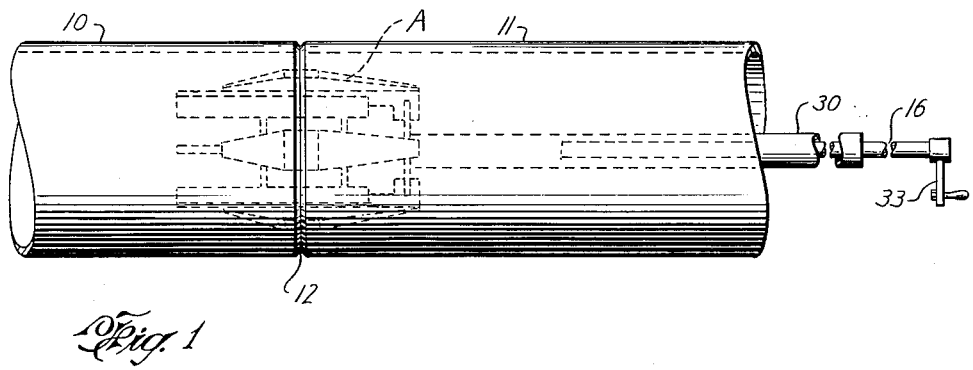

March 27, 1956  P. B. MITCHELL  2,739,559
PIPE ALIGNING TOOLS
Filed June 10, 1950  3 Sheets-Sheet 1

Presse B. Mitchell
INVENTOR.

BY J. Vincent Martin
and
Joe E. Edwards
ATTORNEYS

March 27, 1956  P. B. MITCHELL  2,739,559
PIPE ALIGNING TOOLS
Filed June 10, 1950  3 Sheets-Sheet 2

Presse B. Mitchell
INVENTOR.

BY J. Vincent Martin
and
Joe E. Edwards
ATTORNEYS

March 27, 1956 P. B. MITCHELL 2,739,559
PIPE ALIGNING TOOLS
Filed June 10, 1950 3 Sheets-Sheet 3

Presse B. Mitchell
INVENTOR.
BY J. Vincent Martin
and
Joe E. Edwards
ATTORNEYS

United States Patent Office 2,739,559
Patented Mar. 27, 1956

2,739,559

PIPE ALIGNING TOOLS

Presse B. Mitchell, Longview, Tex.

Application June 10, 1950, Serial No. 167,473

1 Claim. (Cl. 113—103)

This invention relates to new and useful improvements in pipe aligning tools.

One object of the invention is to provide an improved pipe aligning tool which is an improvement on the pipe aligning tool disclosed in my copending application, Serial No. 558,884, filed October 16, 1944, which application has matured into U. S. Patent No. 2,522,459.

An important object of the invention is to provide an improved tool which will accurately align adjoining or adjacent pipe sections which are to be welded or otherwise secured together whereby said pipe sections are maintained in coaxial aligned position during the welding or securing operation.

Another object of the invention is to provide an improved pipe aligning tool wherein expanding shoes are adapted to be engaged with the ends of the adjacent pipe sections, with said tool having improved means for properly locating the aligning shoes with respect to the joint.

Another object is to provide a tool of the character described wherein depressible latch members are employed for locating the aligning shoes with respect to the joint and also wherein said latch members are automatically disengaged and moved out of the joint when the expansible aligning shoes are moved into an expanded position to accomplish the aligning operation.

Still another object is to provide a pipe aligning tool of the character described having an improved connecting means between the expansible aligning shoes and the operating element, whereby the aligning shoes may undergo a free unrestricted radial movement to assure efficient operation without binding of said shoes.

A further object is to provide an aligning tool of improved construction having supporting rollers which facilitate the movement of the tool within the pipe and having aligning shoes of improved design whereby accurate alignment of the pipe joint may be accomplished without interfering with the subsequent welding operation.

Still another object is to provide an improved tool, of the character described, having an improved central supporting assembly which is constructed so that it may be employed as the main assembly for various size tools whereby the device may be readily converted for use with different size pipe; the tool being operable either manually, electrically or hydraulically as conditions dictate.

The construction designed to carry out the invention will be hereinafter described together with other features thereof.

Figure 2:
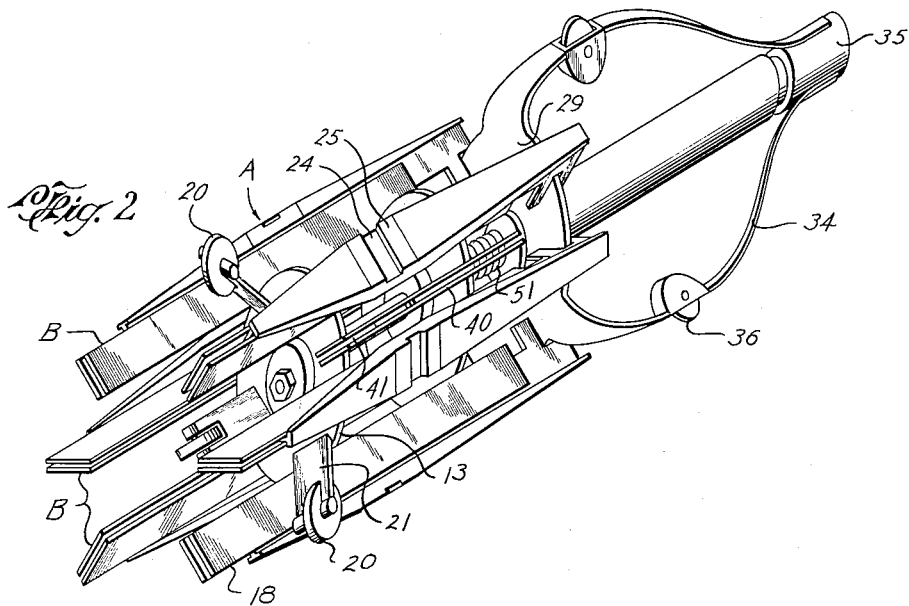
Figure 3:
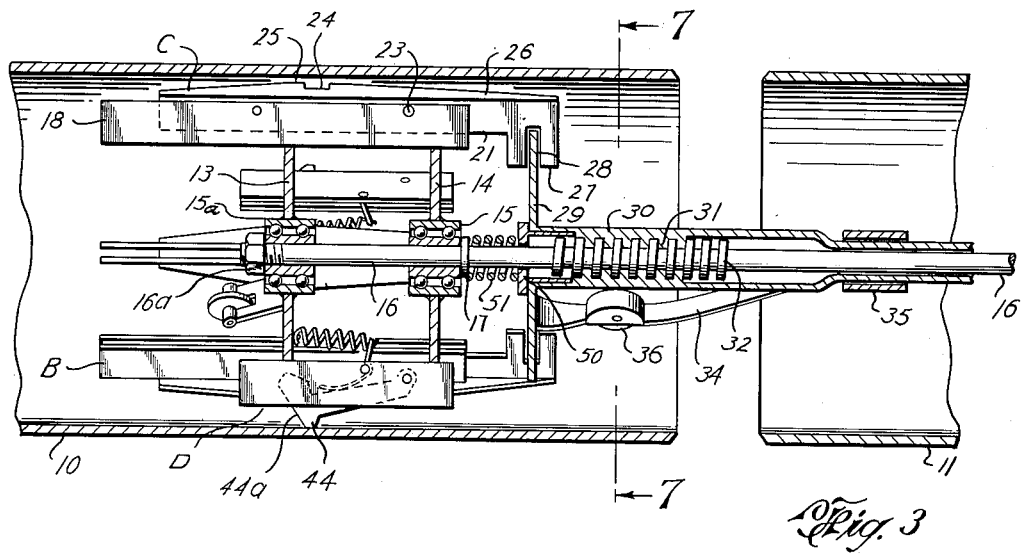
Figure 8:
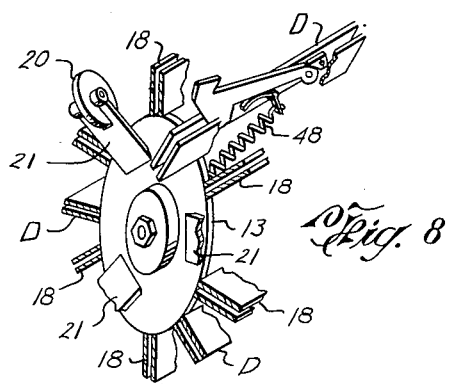
Figure 7:
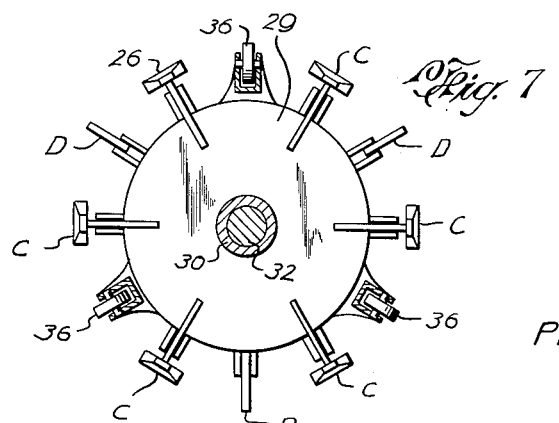
Figure 4:
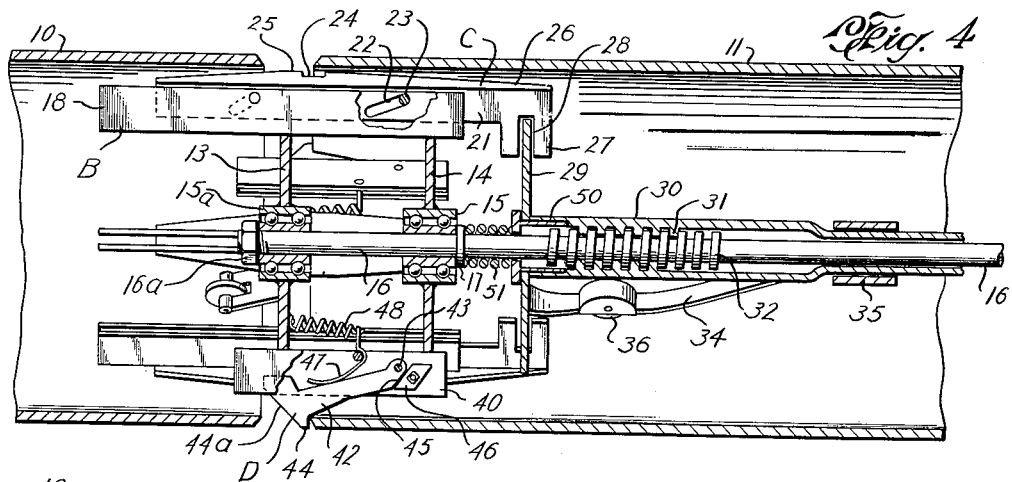
Figure 5:
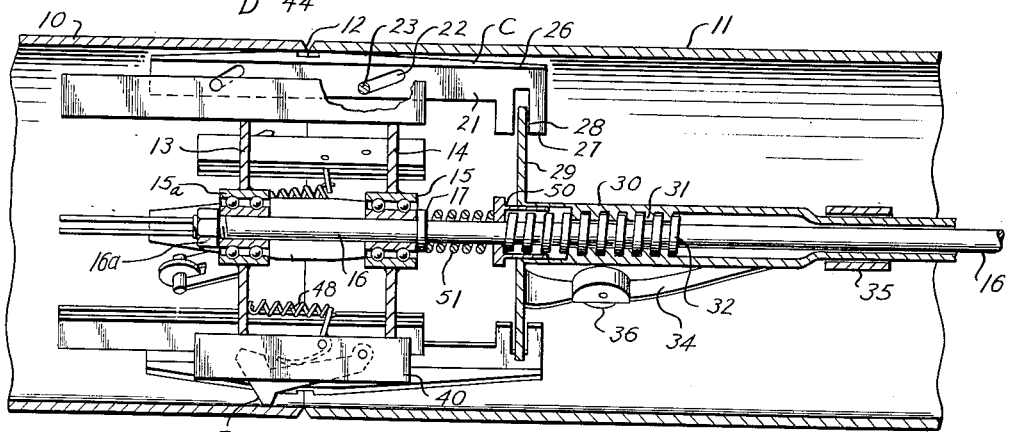
Figure 6:
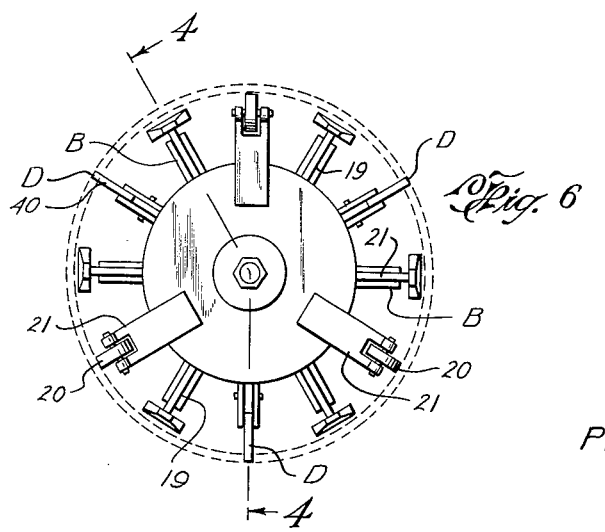

The invention will be more readily understood from a reading of the following specification and by reference to the accompanying drawings forming a part thereof, wherein an example of the invention is shown, and wherein:

Figure 1 is an elevation of the ends of two pipe sections which are to be welded together and illustrating the improved aligning tool, constructed in accordance with the invention, disposed within said pipe sections, Figure 2 is an isometric view of a pipe aligning tool constructed in accordance with the invention, Figure 3 is a longitudinal sectional view illustrating the aligning tool within one section of the pipe and showing the position of the parts prior to the movement of the aligning tool into position opposite the joint between the pipe sections, Figure 4 is a view similar to Figure 3 showing the tool located at the joint between pipe sections, Figure 5 is a view similar to Figure 4 with the aligning shoes in an expanded position and with the pipe sections engaged with each other preparatory to the welding operation, Figure 6 is an end elevation of the tool, Figure 7 is a transverse sectional view taken on the line 7—7 of Figure 3, and Figure 8 is a partial isometric view of the main supporting assembly.

In the drawings, the numeral 10 designates a section of tubular pipe which is to be welded or connected to a second section 11 of similar pipe. The ends of the pipe sections 10 and 11 are ordinarily beveled and abut each other to provide a joint 12 which is subsequently welded to join the pipe sections to each other. The pipe aligning tool A is adapted to be inserted within the bore of the pipe sections and as will be explained, functions to accurately align the pipe sections whereby an efficient connection can be made between said sections. After the joint 12 is welded the tool A is moved outwardly through the bore of the pipe section 11 and is utilized to align the next joint (not shown) which would be between the pipe section 11 and another pipe section which is not illustrated. It will thus be apparent that the aligning tool A is pulled through the bore of the pipe sections as the various sections are connected to each other.

The aligning tool comprises a main supporting assembly which includes a pair of circular supporting plate 13 and 14. The plates are provided with bearings 15 and 15a, respectively, mounted in an axial opening within each plate and the bearings 15 and 15a surround an operating shaft 16 which is rotatable with respect to the circular plates 13 and 14. The shaft projects through the bearings and has a nut 16a on its end abutting the bearing and is provided with a shoulder 17 which abuts the bearing 15a. The bearings are in spaced relation on the shaft 16 whereby the circular supporting plates 13 and 14 are spaced from each other longitudinally of said operating shaft and are confined between the nut 16a and shoulder 17.

A plurality of longitudinal guide elements B are secured to the periphery of the supporting plates 13 and 14 and as is clearly shown in Figure 6, six guide elements are spaced equi-distant around the plates. Each guide element comprises a pair of longitudinally extending spaced bars or members 18 and as is clearly shown in Figures 3 to 5, the lower edges of the bars 18 are welded or otherwise secured to the peripheral edges of the end plates 13 and 14. It is noted that the spaced bars 18 of each guide element are considerably longer than the space between the supporting plates 13 and 14 so that said bars project beyond said plates; also, since the lower edges of the bars 18 are welded or otherwise secured to the plates, said bars function as a connecting means between said plates to connect the same to each other. As will be explained, the longitudinal space 19 between the bars 18 of each guide element is adapted to receive an elongate aligning shoe C.

For supporting the weight of the assembly and facilitating its movment through the interior of the pipe sections, a plurality of rollers 20 are provided. Each roller 20 is mounted in the outer end of a radially extending bracket 21 which has its inner end welded or otherwise secured to the supporting plate 13. The rollers 20 are adapted to engage or ride upon the internal surface of the pipe sections which are to be connected together.

Each guide element B has an elongated aligning shoe C movable within the groove or space 19 formed by the bars 18 of said element and each guide shoe is generally T-shaped in cross-section (Figure 6) with a depending rib 21 disposed within the space 19. The rib 21 is formed with inclined slots 22 which extend transversely through the rib and these slots are adapted to receive pins 23 which span the space or groove 19 between the bars 18 of each guide element. It will be evident that since the pins 23 are fixed within the side bars of each guide element and since the slots 22 are inclined, a relative movement between the guide element 18 and its complementary aligning shoe C will result in a radial movement of said shoe with respect to the guide element. The pins 23 and the coacting slots 22 thereby provide a simple and effective means for accomplishing radial movement of each guide shoe C with respect to its guide element and the supporting assembly to which said element is attached. The outer surface of the elongate guide shoe is formed with a central groove 24 and substantially flat portions 25 on each side of the groove; beyond these flat portions the outer surface of each shoe is gradually tapered or inclined downwardly and with this arrangement when the shoes are in expanded position each shoe will contact the bore of the pipe sections at the surfaces 25 of the shoe. The central groove 24 will be disposed immediately below the joint 12 between the pipe sections (Figure 5) so that the shoes will not interfere with a subsequent welding operation.

For actuating the aligning shoes to expand and retract the same radially of the supporting assembly, each aligning shoe is formed with an inwardly projecting extension 27 which is provided with a recess 28 extending inwardly from its inner edge. An actuating disc 29 has its peripheral edge portion engaged in the recesses 28 of the extensions 27 of the shoes, and this disc is attached or made integral with the inner end of a tubular sleeve 30. The sleeve surrounds the operating rod 16 and has connection therewith through threads 31 which engage threads 32 formed on the operating rod. Beyond the sleeve is slightly reduced to closely engage the outer surface of the operating rod 16 and extends for a sufficient distance to project outwardly from the pipe section within which the device is disposed. The outer reduced portion of the sleeve functions as a handle which may be grasped by the operator and the operating rod 16 projects therefrom being provided with a suitable crank 33 which will facilitate rotation of the operating rod.

It will be apparent that the operator may grasp the tubular handle 30 with one hand and may rotate the rod 16 by means of the crank 33 with the other hand, and such rotation will result in a movement of the rod 16 with respect to the tubular handle. The tubular handle or sleeve 30 has connection with the aligning shoes C through the disc 29 and recesses 28 and thus the aligning shoes are maintained stationary. As the operating rod 16 is rotated and moved longitudinally with respect to the sleeve said rod imparts a movement to the main supporting assembly comprising the circular plates 13 and 14 and the guide elements B which are confined on the rod between the nut 16a and shoulder 17 and are thus, in effect, attached to said rod. Suitable thrust bearings (not shown) may be provided between the shoulder 17 and the bearing 15 and also between the nut 16a and the bearing 15a to take longitudinal thrust. It is thus apparent that the aligning shoes are held stationary while the supporting assembly moves longitudinally with respct thereto and this causes the transverse pins 23 carried by the guide elements B to be moved with respect to the inclined slots 22 of the aligning shoes C.

In Figure 4 the shoes are illustrated as in a retracted position and as the rod is rotated, the pins 23 and the supporting assembly move to the left in Figure 4 and finally assume the position shown in Figure 5. In such position the pins 23 have coacted with the slots 22 of the guide shoes C and said shoes have been expanded into engagement with the internal wall of the pipe sections 10 and 11. Of course, upon a reverse rotation of the operating rod the pins 23 again coact with the slots 22 in the shoes C to effect a radial retraction thereof. It is noted that as the shoes expand and retract the recesses 28 in the projections 27 of the shoes merely move inwardly and outwardly of the retaining disc 29, which disc functions to prevent longitudinal movement of the shoes with relation to the disc 29 and tubular sleeve 30. The particular connection between the shoes and the retaining disc 29 prevents a free unrestricted radial movement of each shoe without any binding action.

In order to assist in facilitating the movement of the unit through the pipe, flexible strap elements 34 have one end secured to the retaining disc 29 while their opposite ends are fastened to a collar 35 which is freely rotatable upon the tubular sleeve 30. Each of the straps 34 which are generally bowed carry a roller 36 which is adapted to engage the wall of the pipe. Thus, the rollers 36 together with the rollers 20 which are secured to the main supporting assembly facilitate the free movement of the tool within the pipe. It is preferable that the rollers 20 and 36 be disposed in the same longitudinal plane so that they will, in effect, follow the same path within the pipe. The strap elements 34 not only function as a guide and support for the tool as it is moved within the pipe but also act to reinforce the retaining disc 29.

When the tool is being employed for aligning the adjacent pipe sections at the joint therebetween, it is desirable to accurately locate the central portion or groove 24 of each aligning shoe immediately below the joint 12 and for this purpose a plurality of latch members D are provided. As shown in Figure 6, three latch members D are equally spaced around the supporting assembly are employed, but it is obvious that any desired number could be used. Each latch member comprises a pair of spaced supporting bars 40 which have their inner edges welded or otherwise secured to the supporting plates 13 and 14. These bars 40 also function to more firmly attach the plates 13 and 14 to each other to provide a unitary structure. The space 41 between the bars 40 has a latching dog 42 disposed therebetween, and this dog has one end pivoted on a transverse pin 43 which spans the space 41. Each latching dog 42 has a latching projection 44 at its outer end and has a flat shoulder area 45 at its pivoted end, the shoulder being adapted to engage a stop 46 which limits outward swinging movement of the dog. The dog is constantly urged toward an outward position by a pivoted arm 47 which is maintained in engagement with the dog by a spring 48 (Figure 4). The extreme outer end of the dog beyond the projection 44 is formed with an inclined surface 44a.

In operation of the latching members D, the latching members are engaged with the bore of the pipe section 10, as shown in Figure 3, prior to the time that the alignment tool is to be actuated. As the pipe section 11 is moved into place with its end slightly spaced from the end of the section 10, the entire tool is moved toward the joint between the pipes which would be in a direction to the right in Figure 3. As such movement of the tool occurs, the projections 44 of the latching dogs 42 ride the wall of the bore of the pipe section 10 and are constantly urged into contact with the wall by the spring 48 and arm 47. As the latching dogs 42 move opposite the joint the projections 44 of the dogs move outwardly into the space between the pipe sections 10 and 11 and said projections engage the end of the pipe section 11 as shown in Figure 4 to halt further movement of the tool in a direction to the right. When the dogs 42 have swung outwardly as shown in Figure 4, the projections 44 are aligned in a transverse plane with the central grooves 24 of the aligning shoes C and thus the grooves 24 of said shoes are properly aligned with the end of the pipe section 11.

The pipe section 11 is then moved inwardly against the pipe section 10, the tool moving therewith as a unit and as the pipe sections 10 and 11 engage to make the joint 12, the central grooves 24 in each shoe are properly located immediately below this joint. As the pipe section 11 was moved into abutting relationship to the section 10, the inclined surface 44a on the outer end of each dog 42 coacts with the pipe section 10 and is moved inwardly so that its projection 44 is restricted from the joint to thereby allow the pipe sections to abut each other.

When the operating rod 16 is subsequently rotated to impart a movement to the supporting assembly the dogs 42 being carried by said assembly are moved longitudinally of the pipe to the position shown in Figure 5, whereby the projections 44 of the dogs are moved out of alignment with the joint. It will be evident that the same motion which effects the radial expansion of the aligning shoes C also functions to move the latching dogs out of alignment with the joint whereby the subsequent welding operation may be efficiently carried out.

In order to protect the threads of the worm screw 32 on the operating rod and the threads of 31 within the interior of the tubular sleeve 30, a flanged protective collar 50 is engageable within the inner end of the sleeve 30. A coil spring 51 which surrounds the operating rod 16 is confined between the collar 50 and one of the shoulders 17 and functions to maintain the collar inwardly of the sleeve. When the aligning shoes C are retracted the collar 50 is within the sleeve 30 as shown in Figure 4; when the aligning shoes are expanded the latching dogs have moved to the position shown in Figure 5 and are disposed out of alignment with the joint 12 between the pipe sections.

In the operation of the tool, said tool is disposed within a pipe section and is located nearer the end of said section to which another pipe section to be connected. The pipe section to be connected is slipped over the tool and is moved to the position down in Figure 3. At this time the tool is supported upon the rollers 20 and 36 and the aligning shoes C are in a retracted position. The latching doges 42 have their projections 44 engaged with and riding upon the wall of the pipe. As the pipe section which is to be connected moves into close proximity to that pipe section in which the tool is located, the tool is moved in a direction toward the space between the pipe sections and the dogs riding upon the wall of the pipe will be expanded into the area between the pipe sections as said dogs reach such area. Upon this expansion the projections 44 engage the end of the pipe section indicated at 11 in the drawings to halt further movement of the tool with respect to the pipe and to also align the central groves 24 of the aligning shoes with the joint.

The two pipe sections are then moved into abutting relation and due to the inclined surfaces 44a of the latching dogs this movement effects a retraction of the dogs which allows the pipe sections to engage each other at the joint 12. The operator then grasps the tubular sleeve or handle 30 with one end and rotates the operating shaft 16 with the other hand. The sleeve 30 which is connected with the aligning shoes C is then held stationary and as the operating rod rotates a longitudinal movement is imparted to the main supporting assembly which carries the guide elements B and the actuating pins 23. Movement of the pins 23 with respect to the inclined slots 22 of the aligning shoes results in an expansion of said shoes so that the central contact areas 25 of the guide shoes engage the wall of the bore of each pipe. It is evident that as the expanding shoes move into an expanded position the adjacent pipes are accurately aligned.

As the main supporting assembly was moved longitudinally with respect to the shoes to expand said shoes the lacthing dogs 42 carried by this assembly are moved therewith and thus the projections 44 of said latching dogs are misaligned with the joint 12. The recesses 24 in the expanding shoes remain in alignment with the joint 12 and are disposed immediately below said joint. Thus, a normal welding operation which welds the two pipe sections together at the joint 12 may be carried out.

After the connection is made, it is only necessary to rotate the crank 33 and operating rod 16 in a reverse direction which will cause the main supporting assembly to move longitudinally with respect to the aligning shoes and through the pins 23 and slots 22 retract said shoes. The entire tool is then moved along the pipe section 11 and is halted adjacent the opposite end thereof. The next pipe section is then threaded over the tool and the operation is repeated at the next joint.

From the foregoing, it will be evident that a simple and effective aligning tool is provided. The aligning shoes are readily expanded and retracted, and when in an expanded position function to accurately align the adjoining pipe sections. The latching members D function automatically to locate the aligning shoes in proper position and upon subsequent movement of the pipe sections into abutting position, the latch mebers are automatically retracted; the succeeding operation which effects the expansion of the aligning shoes also moves the latching members longitudinally of the pipe and out of alignment with the pipe joint between the abutting pipe sections. The particular connection between the aligning shoes and the tubular sleeve 30 permits a free and unrestricted radial movement of the shoes, whereby efficient expansion of said shoes is assured.

The tool has been described as employing the aligning shoes for axially aligning the ends of the pipe section whereby a suitable weld may be made at the joint. However, it is pointed out that the tool could be employed as a pipe straightener to eliminate dents which may be formed in the pipe or to bring out-of-round pipe back into an accurate circular configuration. In such case, the aligning shoes would be removed and aligning shoes having arcuate contact areas would be substituted therefor. The operation would be identical in that the tool would be disposed in the bore of the pipe and the shoes then subsequently expanded to apply an internal radial pressure to the pipe at all contact points. When the tool is employed for pipe straightening it is evident that the latch assemblies would have no particular function and the latching dogs would merely engage the inner portion of the pipe.

The tool has been described as manually operated but it is apparent that rotation may be imparted to the operating shaft 16 by any suitable power means, either electric, air or hydraulic. In such instance, any suitable clamp may be employed for holding the handle element 30 stationary while the power means rotates the operating shaft or rod. The particular main supporting assembly of the tool comprises the discs 13 and 14 which are spaced from each other and to which the guide elements B are guided or otherwise secured. This skeleton type of main supporting assembly minimizes the weight of the structure which facilitates its handling within the pipe; also in order to change the size of the tool to make it adaptable for use in different size pipes, it is only necessary to increase or decrease the size of the end plates 13 and 14. When this is done the guide elements B attached to said plates are moved inwardly or outwardly with respect to the center of the device and all other parts of the unit may be substantially the same. The extensions 27 on the shoes C may be of sufficient size to compensate for changes in the outer diameter of the tool so that the same retaining disc 29 may be employed with different size tools.

From the foregoing it will be seen that this invention is one well adapted to attain all of the ends and objects of the invention hereinabove set forth, together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having described the invention, I claim:

A pipe aligning tool comprising an expansible head including an elongated main body portion provided with spaced apart parallel vane guides extending in radial directions with respect to the center line of said elongated main body portion and fixed to said body portion and supporting longitudinally radially disposed vanes, each of said vanes being provided with mating slots extending at an angle to the center line of said main body portion through each of which slots a guide pin fastened to said vane guide is extended, each of said vanes supporting internal pipe surface shoes, each of said shoes having an internal recess therein, each of said vanes being connected to an internally threaded sleeve by a disc secured to the sleeve at the threaded end thereof and freely riding in said shoe recesses, said internal recesses being in the ends of the shoes adjacent the threaded end of the sleeve, a means for moving said vanes including an externally threaded expanding rod secured to and extending from said main body portion in threaded engagement with said internally threaded sleeve, said main body portion being rotatable but laterally fixed to said rod, a protective collar provided with an inwardly and an outwardly directed flange at the inner end thereof and positively positioned to surround said rod, said inwardly directed flange providing a first stop means contacting the end of the thread, said outwardly directed flange providing a second stop means contacting the end of the sleeve, a spring surrounding said rod and positioned between a flange on said body portion and said inwardly directed flange, whereby a rotary movement of said expanding rod with respect to said sleeve produces a longitudinal movement of said main body portion with respect to said vanes resulting in radial movements of said vanes with respect to said main body portion, said collar being also slidably mounted in the inner end of said sleeve, said spring urging said collar into said sleeve as far as said first stop means will permit, said collar being movable with respect to said sleeve upon movement of the threads of said expanding rod beyond the inner end of said sleeve.

References Cited in the file of this patent

UNITED STATES PATENTS

| Number | Name | Date |
|---|---|---|
| 291,282 | Blue | Jan. 1, 1884 |
| 758,996 | Meisel | May 3, 1904 |
| 1,016,738 | Curry | Feb. 6, 1912 |
| 1,093,284 | Mehlum | Apr. 14, 1914 |
| 1,922,324 | Price | Aug. 15, 1933 |
| 1,962,350 | Kane | June 12, 1934 |
| 1,980,419 | Martin | Nov. 13, 1934 |
| 2,221,326 | Holman | Nov. 12, 1940 |
| 2,280,370 | Bennett | Apr. 21, 1942 |
| 2,295,996 | Lauffenburger | Sept. 15, 1942 |
| 2,302,813 | Stuhlfauth et al. | Nov. 24, 1942 |
| 2,339,543 | Bishop | Jan. 18, 1944 |
| 2,379,210 | Alyea | June 26, 1945 |
| 2,408,255 | Elliott | Sept. 24, 1946 |
| 2,413,103 | Forbes | Dec. 24, 1946 |
| 2,429,053 | Forbes | Oct. 14, 1947 |
| 2,452,867 | Price | Nov. 2, 1948 |
| 2,522,459 | Mitchell | Sept. 12, 1950 |
| 2,525,680 | Ingemarson | Oct. 10, 1950 |
| 2,587,940 | Webster | Mar. 4, 1952 |
| 2,591,730 | Sendzimir | Apr. 8, 1952 |
| 2,594,000 | Elliott | Apr. 22, 1952 |

FOREIGN PATENTS

| Number | Country | Date |
|---|---|---|
| 142,253 | Great Britain | May 6, 1920 |